US006578031B1

(12) United States Patent
Washizawa

(10) Patent No.: US 6,578,031 B1
(45) Date of Patent: Jun. 10, 2003

(54) APPARATUS AND METHOD FOR RETRIEVING VECTOR FORMAT DATA FROM DATABASE IN ACCORDANCE WITH SIMILARITY WITH INPUT VECTOR

(75) Inventor: Teruyoshi Washizawa, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/406,696

(22) Filed: Sep. 28, 1999

(30) Foreign Application Priority Data

Sep. 30, 1998 (JP) ............................................ 10-277656
Sep. 30, 1998 (JP) ............................................ 10-277657

(51) Int. Cl.$^7$ ............................................... G06F 17/30
(52) U.S. Cl. ........................ 707/6; 707/1; 707/3; 707/5
(58) Field of Search ........................................ 707/1–10

(56) References Cited

U.S. PATENT DOCUMENTS

| | | | | |
|---|---|---|---|---|
| 5,303,381 A | * | 4/1994 | Yagasaki | ................. 340/146.2 |
| 5,606,690 A | * | 2/1997 | Hunter et al. | ............... 382/229 |
| 6,018,735 A | * | 1/2000 | Hunter | ......................... 706/2 |
| 6,334,129 B1 | * | 12/2001 | Kiyoki et al. | .................. 707/1 |
| 6,338,060 B1 | * | 1/2002 | Washizawa | ..................... 707/5 |

OTHER PUBLICATIONS

Ishwar K. Sethi Et Al, "Storage and Retrieval for Still Image and Video Databases IV", SPIE–The International Society for Optical Engineering, vol. 2670, 1996.
R.F. Sproull, "Refinements to Nearest–Neighbor Searching in k–Dimensional Trees", Algorithmica—An International Journal in Computer Science, vol. 6, pp 579–589, 1991.
E. von Puttkamer, "A Simple Hardware Buddy System Memory Allocator", IEEE Transactions on Computers, vol. C–24, pp 953–1006, 1971.
David A. White Et Al., "Similarity Indexing with the SS–tree", Proceedings of the Twelfth (International Conference on Data Engineering, IEEE Computer Society Press, pp 516–523, 1996.
Sameer A Nene et al., "A Simple Algorithm for Nearest Neighbor Search in High Dimensions", IEEE Transactions on Pattern Analysis and Machine Intelligence, vol. 19, No. 9, pp 989–1003, 1997.

* cited by examiner

Primary Examiner—Kim Vu
Assistant Examiner—Joon Hwan Hwang
(74) Attorney, Agent, or Firm—Fitzpatrick, Cella, Harper & Scinto

(57) ABSTRACT

A list of data of a database arranged in an order of a value of each component of a vector is formed for each component. For each component sequentially selected from base indexes, a pointer indicating data in an ascending order of a difference between data in the list and a test data is updated. Whether an end condition is satisfied or not is judged from a difference of component value between the data indicated by the pointer and the test data. If the end condition is not satisfied, whether a rejection condition is satisfied or not is judged from a distance in a partial space between the data indicated by the pointer and the test data. If the rejection condition is not satisfied, a distance in a whole space between the data indicated by the pointer and the text data is calculated. A predetermined number of data pieces are retrieved in an ascending order of a calculated distance. In this manner, the predetermined number of data pieces having a high similarity to the test vector can be retrieved at high speed from data of a vector format in the database.

26 Claims, 12 Drawing Sheets

APPARATUS AND METHOD FOR RETRIEVING VECTOR FORMAT DATA FROM DATABASE IN ACCORDANCE WITH SIMILARITY WITH INPUT VECTOR

BACKGROUND OF THE INVENTION

1. Field of the Invention

The present invention relates to processing vector format data, and more particularly to a data processing apparatus and method for retrieving a predetermined number of data pieces from a database in accordance with a similarity with input vector.

2. Related Background Art

A distance is widely used as a similarity between data expressed by vector. For example, in a character recognition system and a speech recognition system, sampled data is mapped in a feature quantity space spanned by a proper base to store vector-expressed data as a prototype. A distance between prototypes and newly input data is calculated to identify the input data as belonging to a class corresponding to the nearest prototype.

A calculation method having a worst efficiency is an exhaustive search. A calculation amount by this method is in the order of a product of the vector dimension and the number of prototypes.

The calculation amount of a distance or an inner product is recognized as a critical obstacle against database search. Because of recent rapid progress of a computer processing ability, a database can store not only text data but also non-text data such as images and sounds. In order to search such non-text data by using a keyword as in a conventional method, the non-text data is required to be added with a keyword in advance. If it is desired to avoid a work of adding a keyword, it is necessary to perform a similarity search by using feature quantity vector.

Even in searching text data, a similarity search algorithm is used which searches text data by using vector in order to realize flexible search. In this case, the calculation amount becomes a substantial issue in realizing a search system. The number of data pieces stored in a general database is over several hundred thousands. Therefore, as the order of a vector dimension is raised by one, the calculation amount increases desperately by several hundred thousands times.

In order to avoid such a case, it is essential to either lower the order of a vector dimension or reduce the number of data pieces to be calculated. The former corresponds to lowering the order of a vector dimension of a space which expresses data. Therefore, there is a possibility that information necessary for data search is not sufficiently expressed in vector components. The latter becomes meaningful methodology when the number of data pieces requested as search results is sufficiently small as compared with the total number of data pieces. Those cases to be processed by k-NN search belong to this category, and several effective methods have been proposed.

According to the k-NN search, k prototypes nearest to a test vector are searched from a set of prototypes stored in a system, and in accordance with classes of the searched prototypes, the class of the test vector is identified. In this case, one of important issues is how k prototypes nearest to the text vector are searched at high speed. This requirement is also applied to database search.

A search user desires only data pieces nearest to the search key designated by the user, among a large amount of data stored in a database, and does not desire other data pieces at all, much less values of distances and inner products. Techniques satisfying such requirements of a search user are coincident with objectives of a high speed algorithm of k-NN search.

In order to reduce the calculation amount required for searching k prototypes nearest to a test vector from a set of prototypes, each prototype is generally structurized in advance. The more the quality of data is reflected upon when structurization is performed, the more the search calculation amount is expected to be reduced.

For example, if a prototype is structurized hierarchically, an operation of dividing an N-dimensional space expressing a prototype is recursively repeated. A method of dividing the space by using a boundary which is a hyperplane is called a K-D-B Tree [Document 1], a method of dividing the space by a rectangular plane is called an R-Tree [Document 2], a method of dividing the space by a hyper-sphere is called an SS-Tree [Document 3], and a method of dividing the space by a combination of a rectangular plane and a hyper-sphere is called an SR-Tree [Document 4]. If an N-dimensional vector space is mapped to a space spanned by an eigenvector of a covariance matrix representing a prototype distribution, a structurization more effective for reducing a search calculation amount can be expected [Documents 5, 6].

With these methods, however, the calculation amount and storage capacity necessary for data structurization exponentially increases as the order of a vector dimension is raised. Therefore, application to those data expressed by high-dimensional vector may be practically restricted.

[Document 1] J T. Robinson: "The K-D-B Tree: A search Structure for Large Multidimensional Dynamic Indexes", Proc. on ACM SIGMOD, pp. 10–18, 1981.

[Document 2] A. Guttman: "R-trees: A dynamic index structure for spatial searching", Proc. ACM SIGMOD, Boston, USA, pp. 47–57, June 1984.

[Document 3] D A. White and R. Jain: "Similarity indexing with the SS-tree", Proc. of the 12th Int. Conf. on Data Engineering, New Orleans, USA, pp. 323— 331, February 1996.

[Document 4] Katayama and Satoh: "SR-Tree: A proposal of index structure for nearest neighbor searching of high dimensional point data", IEICE Papers (D-I), vol. 18-D-I, no. 8, pp. 703–717, August 1997.

[Document 5] R F. Sproull: "Refinements to Nearest Neighbor Searching in K-dimensional Trees", Algorithmica, 6, pp. 579–589, 1991.

[Document 6] D A. White and R. Jain: "Similarity Indexing: Algorithms and Performance", Proc. on SPIE, pp. 62–73, 1996).

There are algorithms which use "gentle" structurization not incorporating statistical means and a little "smart" search algorithm, in order to reduce the calculation amount. Of these, one of the most fundamental algorithms is an algorithm by Friedman et al., called a mapping algorithm [Document 7].

[Document 7] J H. Friedman, F. Baskett, and L J. Shustek: "An Algorithm for Finding Nearest Neighbors", IEEE Trans. on Computers, pp. 1000–1006, October 1975.

A data structurization requested as a pre-process of the mapping algorithm is a sorting process of sorting vector at each component, which process corresponds to structurization based upon a phase. Namely, if a prototype is d-dimensional vector, d sorting lists are generated.

With this process, two lists including a list $V_j$ storing j-component values arranged in the ascending order and a list $I_j$ storing corresponding prototype ID numbers, are formed as many as the order of a vector dimension. Namely, the value $V_j(n+1)$ at the (n+1)-th component value from the start of $V_j$ is equal to or larger than $V_j(n)$ at the n-th component value. The j component value $Y_{Ij(n)}(j)$ of the prototype $Y_{Ij(n)}$ having the ID number of $I_j(n)$ is coincident with $V_j(n)$.

A principle of the mapping algorithm for selecting a pair of prototypes nearest to a test prototype from a prototype set will be described with reference to FIG. 10. A search is performed by using a pair of sorting lists $V_m$ and $I_m$ selected by a proper criterion. In the example shown in FIG. 10, an m-axis is selected. Im stores the ID number of data sorted based upon the component values, so that the order on the list correctly reflects the phase along the m-axis. First, a value nearest to the m component X(m) of a test vector X is searched from $V_m$. This value is assumed to be $V_m(j)$. The prototype corresponding to $V_m(j)$ is $Y_{Im(j)}$. In the example shown in FIG. 10, $Y_{Im(j)}$ corresponds to $Y_1$. Although $Y_1$ is nearest to X with respect to the m component, it is not necessarily nearest to X in the whole space.

Next, a distance $\rho(X, Y_1)$ between X and $Y_1$ is calculated. It can be understood that there is a possibility that only a prototype having the m component value belonging to an open interval $(X(m)-\rho(X, Y_1), X(m)+\rho(X, Y_1))$ (area A in FIG. 10) is nearer to X than $Y_1$ and that such a prototype is significant in terms of search target. In the example shown in FIG. 10, the next nearest prototype $Y_2$ with respect to the m component is checked so that the prototype set to be searched is further restricted to $(X(m)-\rho(X, Y_2), X(m)+\rho(X, Y_2))$ (area B in FIG. 10). As above, with the mapping algorithm, the prototype set to be searched is made smaller in accordance with the component value in the one-dimensional space to thereby reduce the calculation amount.

It is reported, however, that the mapping algorithm by Friedman et al. lowers its performance as the order of a vector dimension becomes higher [Document 7]. A ratio of the expected number of prototypes whose distances were actually calculated to the total number of prototypes is herein called a relative efficiency η. For the case that one nearest neighbor is searched from a set of 1000 prototypes, η is 0.03 for two-dimensional vector, whereas η lowers to 0.6 for nine-dimensional vector.

By representing the number of prototypes picked up from a prototype set by $N_{EXT}$ and the number of prototypes whose distances were calculated by $N_g$, the calculation amount required for deciding whether a distance calculation is to be performed is $O(N_{EXT})$, and the calculation amount for actual distance calculation is $O(dN_g)$. As Ng becomes near to the value of $N_{EXT}$, a process overhead is added so that an actual calculation time for nine-dimensional vector may become worse than the exhaustive search. In order to solve this problem that the mapping algorithm cannot be used for high-dimensional vector, Nene et al. have devised a very simple and effective algorithm [Document 8]. This algorithm called "Searching by Slicing" leaves as a search candidate only the prototype belonging to a closed interval $[X(j)-\epsilon, (X(j)+\epsilon]$ spaced before and after the j-th component X(j) of test vector by an amount of $\epsilon$, as a search candidate. Since this algorithm independently evaluates each component, it is apparent that the performance is dependent upon $\epsilon$. Although Nene et al. have proposed a method of deciding a value $\epsilon$, this method is probabilistic and not suitable for high-dimensional vector.

[Document 8] S A. Nene and S K. Nayar: "A Simple Algorithm for Nearest Neighbor Search in High Dimensions", IEEE Trans. on PAMI, vol. 19, no. 9, pp. 989–1003, September 1997.

SUMMARY OF THE INVENTION

It is an object of the present invention to provide a data processing apparatus and method capable of retrieving data relevant to input data from a database having a large amount of data, at high speed.

According to one aspect, the present invention which achieves the object relates to a data processing apparatus comprising: a database storing a set of data of a vector format; list forming means for forming a list of data of the database arranged in an order of a value of each component of a vector, for each component; input means for inputting test data of a vector format; component selecting means for sequentially selecting each component of the vector format; data selecting means for sequentially selecting data in an ascending order of a difference value between the data and the test data from the list, for each component of the vector format; distance calculating means for calculating a distance in a whole space between the data selected by the data selecting means and the test data; retrieving means for retrieving a predetermined number of data pieces in an ascending order of a distance calculated by the distance calculating means; completion judging means for judging, from a difference of a component value between one data piece selected by the data selecting means and the test data, whether data selection by the data selecting means is to be continued or terminated; and distance calculating control means for controlling whether the distance calculating means is to calculate a distance in the whole space, in accordance with a distance in a partial space between the data selected by the data selecting means and the test data.

According to another aspect, the present invention which achieves the object relates to a data processing apparatus comprising: a database storing a set of data of a vector format; pre-processing means for calculating a square of a norm of each data piece in the database and forming a list of data arranged in an order of a value of each component of the vector, for each component; input means for inputting test data of the vector format and operating a metric tensor upon the test data; component selecting means for sequentially selecting each component of the vector format; data selecting means for sequentially selecting data in an ascending order of a difference value between the data and the test data from the list, for each component of the vector format; similarity calculating means for calculating a similarity in a whole space between the data selected by the data selecting means and the test data by using a square of a norm of the data; retrieving means for retrieving a predetermined number of data pieces in a descending order of the similarity calculated by the similarity calculating means; and similarity calculating control means for controlling whether the similarity calculating means is to calculate a similarity in the whole space, in accordance with a similarity in a partial space between the data selected by the data selecting means and the test data.

According to another aspect, the present invention which achieves the object relates to a data processing method comprising: a list forming step of forming a list of data in a database storing a set of data of a vector format, for each component of a vector, the data in the list being arranged in an order of a value of each component; an input step of inputting test data of a vector format; a component selecting step of sequentially selecting each component of the vector format; a data selecting step of sequentially selecting data in an ascending order of a difference value between the data and the test data from the list, for each component of the vector format; a distance calculating step of calculating a distance in a whole space between the data selected at the data selecting step and the test data; a retrieving step of retrieving a predetermined number of data pieces in an ascending order of a distance calculated at the distance calculating step; a completion judging step of judging, from a difference of a component value between one data piece selected at the data selecting step and the test data, whether data selection at the data selecting step is to be continued or terminated; and a distance calculating control step of controlling whether the distance calculating step is to calculate a distance in the whole space, in accordance with a distance in a partial space between the data selected at the data selecting step and the test data.

According to another aspect, the present invention which achieves the object relates to a data processing method comprising: a pre-processing step of calculating a square of a norm of each data piece in a database storing a set of data of a vector format and forming a list of data arranged in an order of a value of each component of the vector, for each component; an input step of inputting test data of the vector format and operating a metric tensor upon the test data; a component selecting step of sequentially selecting each component of the vector format; a data selecting step of sequentially selecting data in an ascending order of a difference value between the data and the test data from the list, for each component of the vector format; a similarity calculating step of calculating a similarity in a whole space between the data selected at the data selecting step and the test data by using a square of a norm of the data; a retrieving step of retrieving a predetermined number of data pieces in a descending order of the similarity calculated at the similarity calculating step; and a similarity calculating control step of controlling whether the similarity calculating step is to calculate a similarity in the whole space, in accordance with a similarity in a partial space between the data selected at the data selecting step and the test data.

According to a further aspect, the present invention which achieves the object relates to a computer-readable storage medium storing a program for controlling a computer to perform data processing, the program comprising codes for causing the computer to perform; a list forming step of forming a list of data in a database storing a set of data of a vector format, for each component of a vector, the data in the list being arranged in an order of a value of each component; an input step of inputting test data of a vector format; a component selecting step of sequentially selecting each component of the vector format; a data selecting step of sequentially selecting data in an ascending order of a difference value between the data and the test data from the list, for each component of the vector format; a distance calculating step of calculating a distance in a whole space between the data selected at the data selecting step and the test data; a retrieving step of retrieving a predetermined number of data pieces in an ascending order of a distance calculated at the distance calculating step; a completion judging step of judging, from a difference of a component value between one data piece selected at the data selecting step and the test data, whether data selection at the data selecting step is to be continued or terminated; and a distance calculating control step of controlling whether the distance calculating step is to calculate a distance in the whole space, in accordance with a distance in a partial space between the data selected at the data selecting step and the test data.

According to a further aspect, the present invention which achieves the object relates to a computer-readable storage medium storing a program for controlling a computer to perform data processing, the program comprising codes for causing the computer to perform: a pre-processing step of calculating a square of a norm of each data piece in a database storing a set of data of a vector format and forming a list of data arranged in an order of a value of each component of the vector, for each component; an input step of inputting test data of the vector format and operating a metric tensor upon the test data; a component selecting step of sequentially selecting each component of the vector format; a data selecting step of sequentially selecting data in an ascending order of a difference value between the data and the test data from the list, for each component of the vector format; a similarity calculating step of calculating a similarity in a whole space between the data selected at the data selecting step and the test data by using a square of a norm of the data; a retrieving step of retrieving a predetermined number of data pieces in a descending order of the similarity calculated at the similarity calculating step; and a similarity calculating control step of controlling whether the similarity calculating step is to calculate a similarity in the whole space, in accordance with a similarity in a partial space between the data selected at the data selecting step and the test data.

Other objectives and advantages besides those discussed above shall be apparent to those skilled in the art from the description of preferred embodiments of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the invention will be detailed with reference to the accompanying drawings.

[First Embodiment]

A high speed algorithm of this embodiment is a mapping algorithm extended to high-dimensional vector in a natural way. This algorithm of the embodiment is a generalized algorithm which does not require "hard" structurization of a prototype set and parameters to be set in advance.

The algorithm by Friedman et al uses a square of a norm of a difference vector mapped to a one-dimensional partial space in order to decide whether the distance between an extracted prototype and a test prototype is to be calculated.

The algorithm proposed in this embodiment adaptively raises the order of a vector dimension of a partial space until the prototype to be searched satisfies some conditions. Namely, if a square of a norm of a difference vector between a text vector and a prototype mapped to an m-dimensional partial space is smaller than a square of a radius $\xi$ of a set of k neighbors already obtained, a difference vector in a (m+1)-dimensional partial space is calculated and compared with $\xi^2$. This process is repeated until the dimension of the partial space becomes coincident with a preset value.

In order to verify the validity of the embodiment algorithm, experiments were conducted by using a set of prototypes generated by a computer by using uniform random numbers. It was confirmed that the calculation amount was able to be reduced even if the order of a vector dimension was raised.

Prior to describing the details of the embodiment algorithm, a subject of study and the definitions of words and symbols will be clarified.

The subject of study is to extract k prototypes from $\Omega$ which prototypes have a metric $\rho$ $(X, Y_j)$ nearest to an arbitrarily given test vector $X \in R^d$, where $\Omega$ is a set of N prototypes $Y_j$ expressed as a d-dimensional vector:

$$\Omega = \{Y_1, Y_2, \ldots, Y_n\}, Y_j \in R^d$$

A Euclidean distance is defined by a squared norm of a difference vector so that a space is assumed to be formed by spanning vector data by an orthogonal base:

$$\rho(X, Y) = \|X - Y\| = \left(\sum_{j=1}^{j=d} (X(j) - Y(j)^2)\right)^{1/2} \quad (1)$$

where k component values of the test vector X and prototype vector $Y_j$ are represented by X(k) and $Y_j$(k), respectively.

Figure 1:
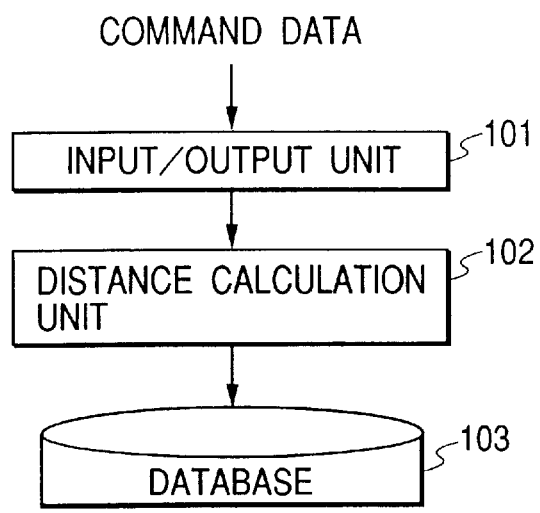
FIG. 1 is a functional diagram of a data processing apparatus according to a first embodiment.

FIG. 1 is a functional diagram of a data processing apparatus of the first embodiment. An input/output unit 101 has an input unit such as a reception apparatus and a keyboard and an output unit such as a transmission apparatus and a display.

For example, in the case of a stand-alone computer, the input/output unit 101 is constituted of a keyboard and a display. Data input from the keyboard is transferred to a distance calculation unit 102, and data supplied from the distance calculation unit 102 is displayed on the display.

Alternatively, in the case of a communications terminal equipment connected to a communications line, the input/output unit 101 is constituted of a communications control apparatus for data transmission/reception. Data input via the communications line is transferred to the distance calculation unit 102, and data supplied from the distance calculation unit 102 is transmitted via the communications line to another terminal at a designated address.

The distance calculation unit 102 is realized by a CPU which executes each function program (corresponding to a process sequence shown in each of flow charts to be described later) stored in a ROM, a disk memory or the like, and has other memories such as a RAM for storing calculation results and various data generated during each process sequence.

A database 103 stores a set of N prototypes expressed by d-dimensional vector, and is accessed by the distance calculation unit 102.

The process to be executed by the distance calculation unit 102 will be described with reference to the flow chart shown in FIG. 2.

At Step S201 it is checked whether any data is input from the input/output unit 101. If not, the flow stands by at Step S201, whereas if data is input, the flow advances to Step S202. At Step S202 it is checked whether the input data indicates that data in the database 103 is to be updated. If not, the flow advances to Step S203, whereas if data is to be updated, the flow advances to Step S204. At Step S203 a pre-process to be described later is executed to thereafter return to Step S201. At Step S204 it is checked whether the input data indicates a calculation process. If a calculation process, the flow advances to Step S205, whereas if not, the flow returns to Step S201. At Step S205, a search process to be described later is executed to thereafter return to Step S201.

Figure 8:
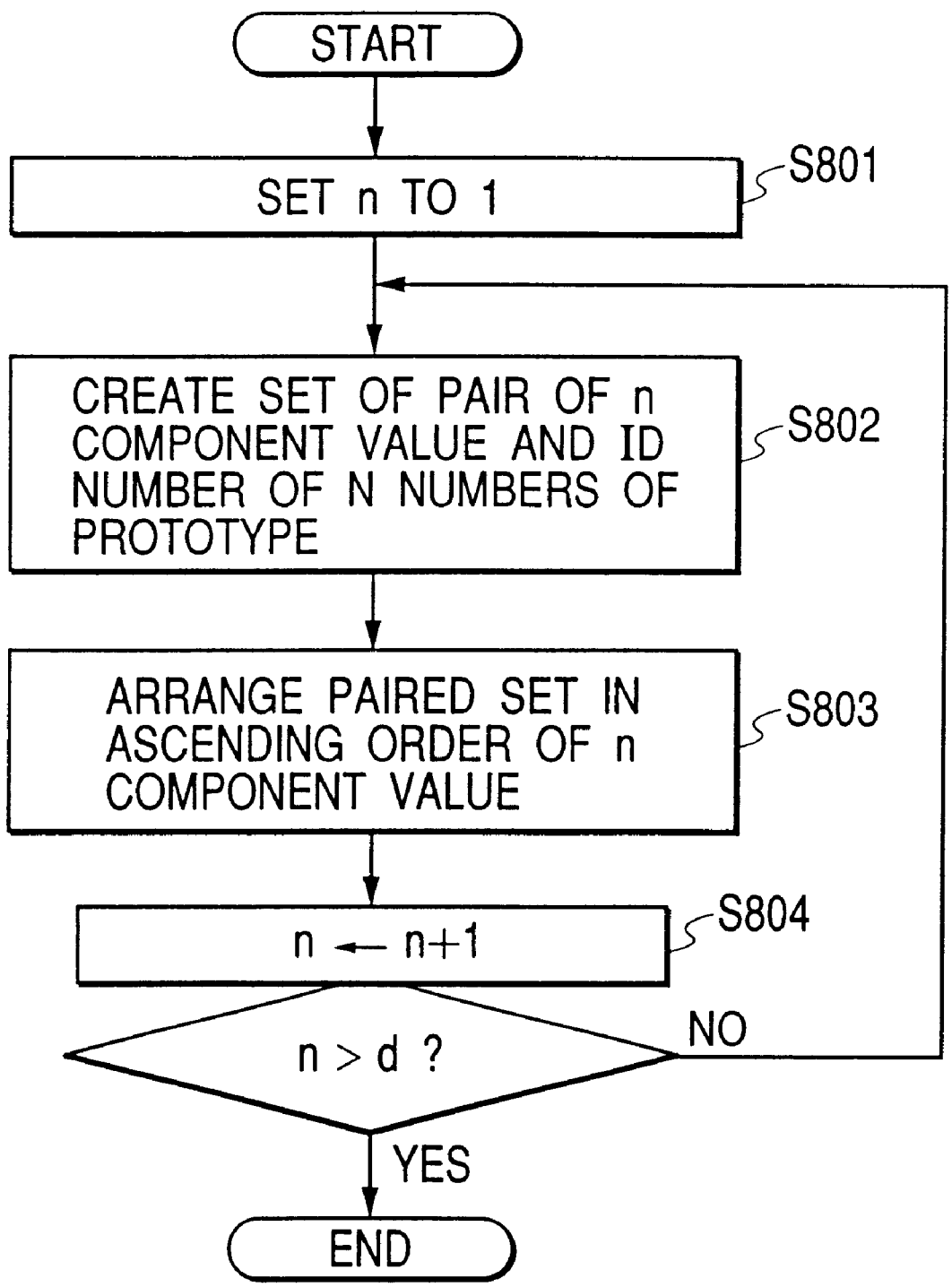
FIG. 8 is a flow chart illustrating a pre-process sequence.

The pre-process to be executed at Step S203 will be described with reference to the flow chart shown in FIG. 8.

In this pre-process, sorting lists are formed with respect to each component value of a prototype set. In this process, two lists including a list $V_j$ storing j-component values arranged in the ascending order and a list $I_j$ storing corresponding prototype ID numbers, are formed as many as the order of a vector dimension. At Step S801 "1" is set to n. At Step S802 a pair of an n-th component value and its ID number is formed for each of N prototypes, namely:

$$\{(Y_1(n), 1), (Y_2(n), 2), \ldots, (Y_N(n), N)\}$$

At Step S803, a set of pairs is rearranged in the ascending order of n component values:

$$\{(Y_{In(1)}(n), In(1)), (Y_{In(2)}(n), In(2)), \ldots, (Y_{In(N)}(n), In(N))\}$$

In the following, the order of component values is represented by a list V and the order of ID numbers is represented by a list I:

$$Vn = \{Y_{In(1)}(n), Y_{In(2)}(n), \ldots, Y_{In(N)}(n)\} \quad (2)$$

$$In = \{In(1), In(2), \ldots, In(N)\} \quad (3)$$

At Step S804 the value n is incremented by "1". If the incremented value n is larger than the order d of a vector dimension, the process is terminated, whereas if not, the flow advances to Step S802.

The relation between the two lists is as follows. Namely, the value $V_{j(n+}1)$ at the (n+1)-th component value from the start of $V_j$ is equal to or larger than $V_j$(n) at the n-th component value. The j component value $V_{Ij(n)}$(j) of the prototype $Y_{Ij(n)}$ having the ID number of $I_j$(n) is coincident with $V_j$(n).

Next, the search process to be executed at Step S205 will be described with reference to the flow chart of FIG. 3.

Given as the input for the search process are a vector X (hereinafter called a test vector) to be searched and the number k of prototypes requested as the search results.

At Step S301 an index list is formed which stores bases of a vector space. This list decides the order of bases which are applied to an end condition and a rejection condition to be described later. For example, this list is formed in correspondence with a descending order of an absolute value of a component value of the test vector X:

$$\Lambda = \{\lambda_1, \lambda_2, \ldots, \lambda_d\} \tag{4}$$

A set of L bases from the smallest is written as:

$$\Lambda_L = \{\lambda_{d-L+1}, \lambda_{d-L+2}, \ldots, \lambda_d\} \tag{5}$$

Figure 4:
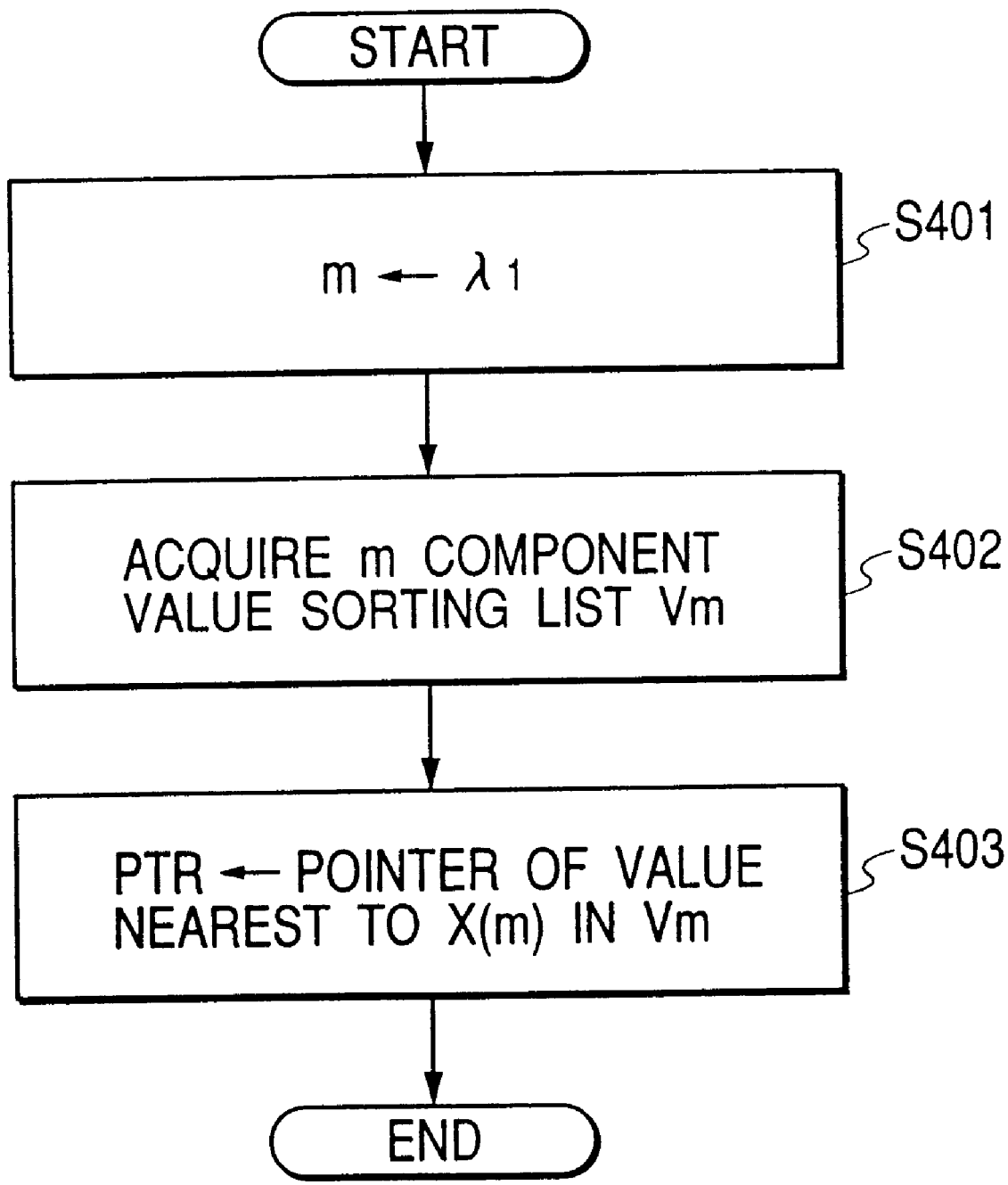
FIG. 4 is a flow chart illustrating an initialization process sequence for a pointer.

At Step S302 an initialization process for PTR and related variables is executed. This process will be described with reference to the flow chart shown in FIG. 4.

At Step S401 $\lambda 1$ is set to m. At Step S402 a sorting list $V_m$ for the m component values is acquired. At Step S403 the value nearest to the m component value X(m) of the test vector is searched from $V_m$, and the position of the value is stored in PTR, namely:

$$|V_m(PTR) - X(m)| \leq |V_m(j) - X(m)|, \forall_j \in \{1, 2, \ldots, N\}$$

The related variables are initialized as follows:

$$PTR_L = PTR-1, BND_L = 0, CAL_L = 0$$

$$PTR_H = PTR+1, BND_H = 0, CAL_H = 0$$

Figure 5:
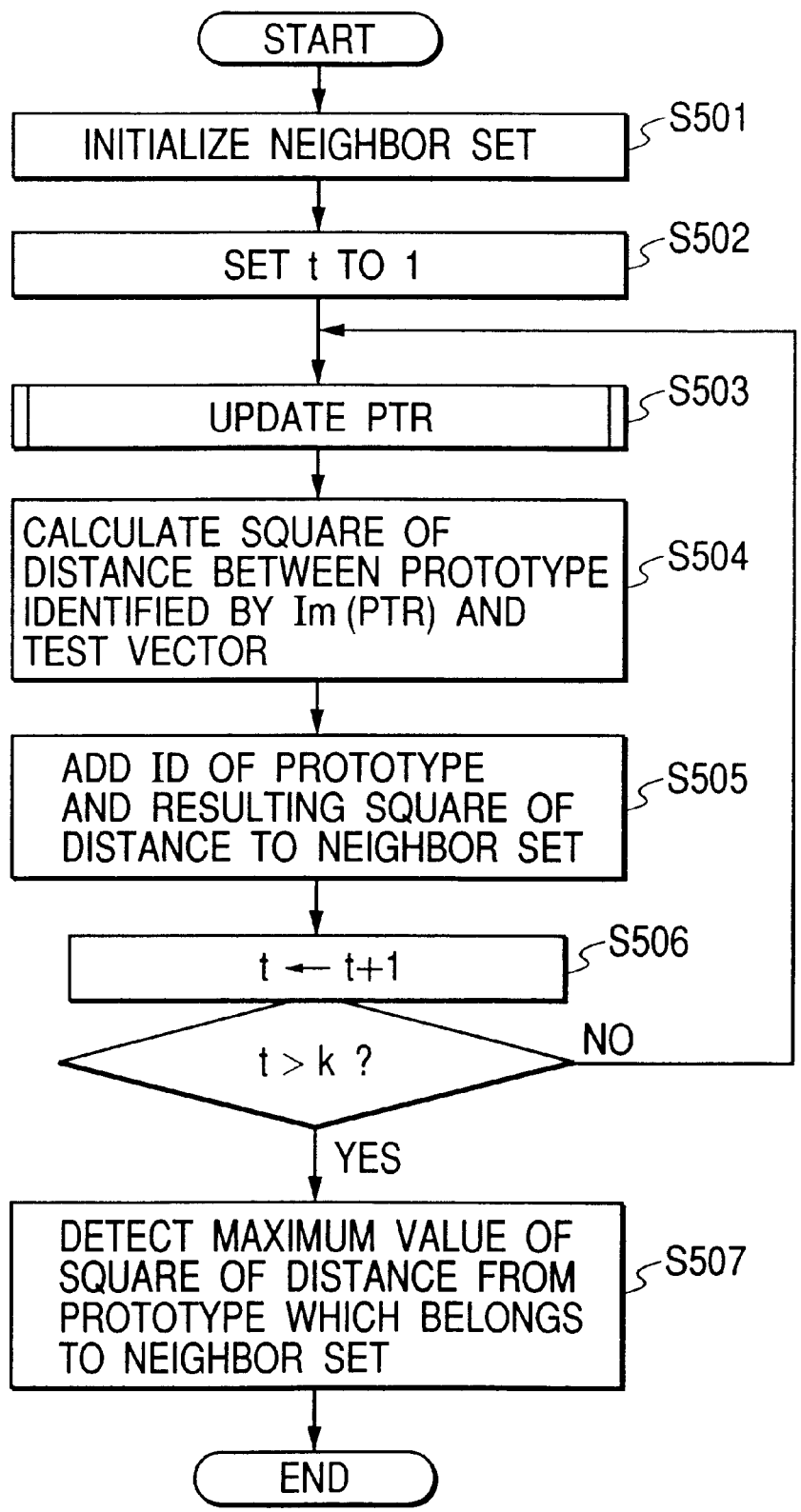
FIG. 5 is a flow chart illustrating an initialization process sequence for a neighbor set.

At Step S303 a set of k neighbors is initialized. This process will be described with reference to the flow chart shown in FIG. 5.

Figure 6:
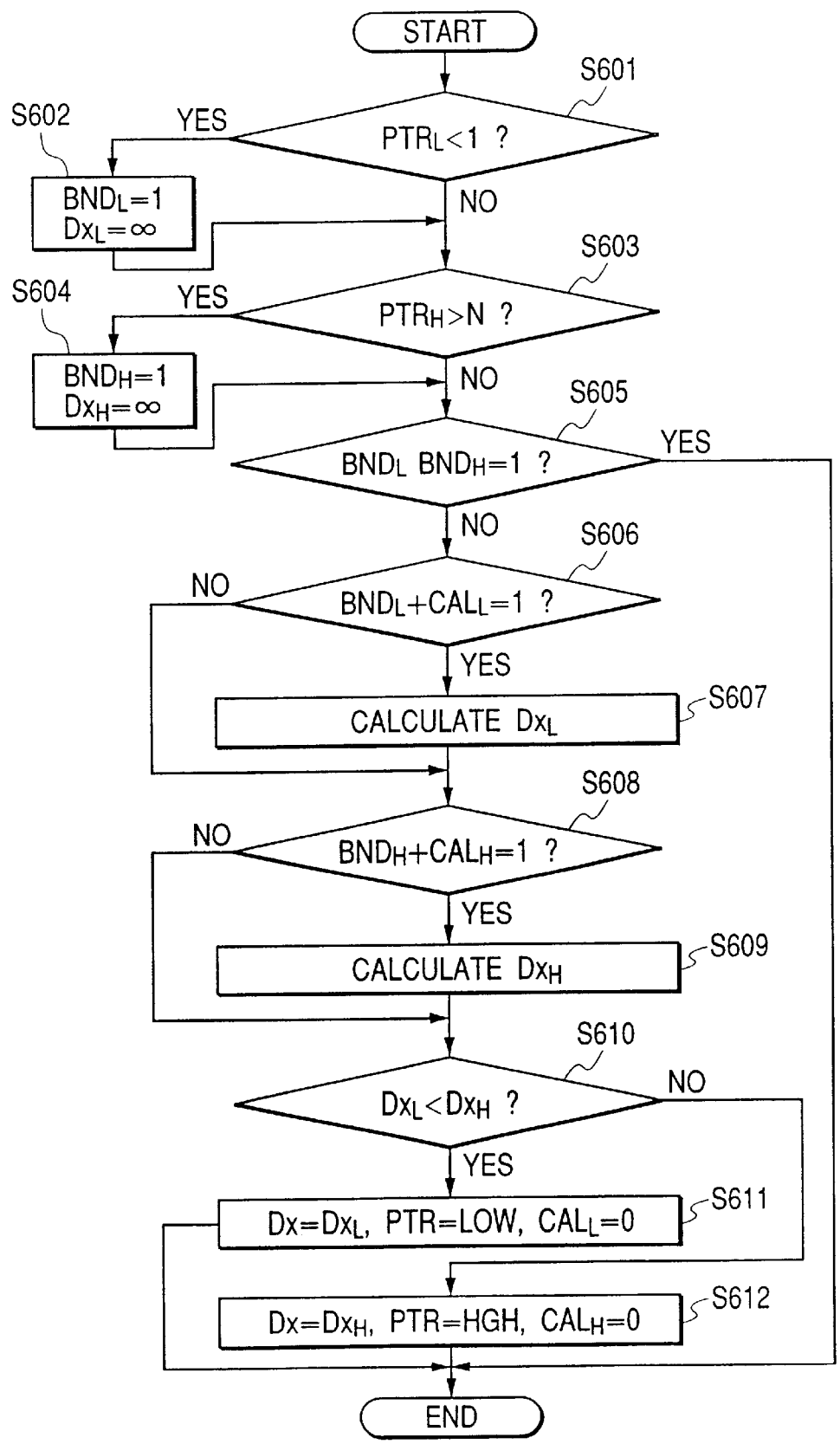
FIG. 6 is a flow chart illustrating an update process sequence for a pointer.

At Step S501, the neighbor set $N_0(X)$ is initialized to an empty set. At Step S502 "1" is set to t. At Step S503 PTR is updated, this process being later described with reference to the flow chart shown in FIG. 6. At Step S504 a square $\rho(X, Y_{Im(PTR)})^2$ of a distance between the test vector X and the prototype $Y_{Im(PTR)}$ having the ID number $I_m(PTR)$ is calculated:

$$\rho(X, Y_{Im(PTR)})^2 = \|X - Y_{Im(PTR)}\|^2 = \left(\sum_{j=1}^{j=d} (X(j) - Y_{Im(PTR)}(j))^2\right)$$

At Step S505 the prototype ID and the square of the distance are added to the neighbor set $N_{t-1}(X)$:

$$N_t(X) = N_{t-1}(X) + \{(I_m(PTR), \rho(X, Y_{Im(PTR)})^2)\}$$

At Step S506 t is incremented by "1". If t is larger than k, the flow advances to Step S507, whereas if not, the flow returns to Step S503.

At Step S507 the maximum value of $\rho(X, Y_{Im(PTR)})^2$ and corresponding ID number in the neighbor set are stored as $\xi_{t-1}$ and $I_{MAX,t-1}$, respectively.

At Step S304 k is set to t. At Step S305 an update process for PTR is executed. This process will be described with reference to the flow chart shown in FIG. 6.

At Step S601 it is checked whether $PTR_L$ is smaller than 1. If smaller, the flow advances to Step S602, whereas if not, the flow advances to Step S603. At Step S602 the following process is executed:

$$BND_L = 1, DX_L = \infty$$

At Step S603 it is checked whether $PTR_H$ is larger than N. If larger, the flow advances to Step S604, whereas if not, the flow advances to Step S605. At Step S604 the following process is executed:

$$BND_H = 1, Dx_H = \infty$$

At Step S605 it is checked whether a product of $BND_L$ and $CAL_L$ is "1". If "1", the search process is terminated, whereas if not, the flow advances to Step S606. At Step S606 it is checked if $BND_L + CAL_L$ is "1". If "1", the flow advances to Step S607, whereas if not, the flow advances to Step S607. At Step S607 the following process is executed:

$$DX_L = (V_m(PTR_L) - X(m))^2$$

$$CAL_L = 1$$

At Step S608 it is checked whether $BND_H + CAL_H$ is "1". If "1", the flow advances to Step S609, whereas if not, the flow advances to Step S610. At Step S609 the following process is executed:

$$DX_H = (V_m(PTR_H) - X(m))^2$$

$$CAL_H = 1$$

If $DX_L$ is smaller than $DX_H$ at Step S610, the flow advances to Step S611, whereas if not, the flow advances to Step S612.

Figure 3:
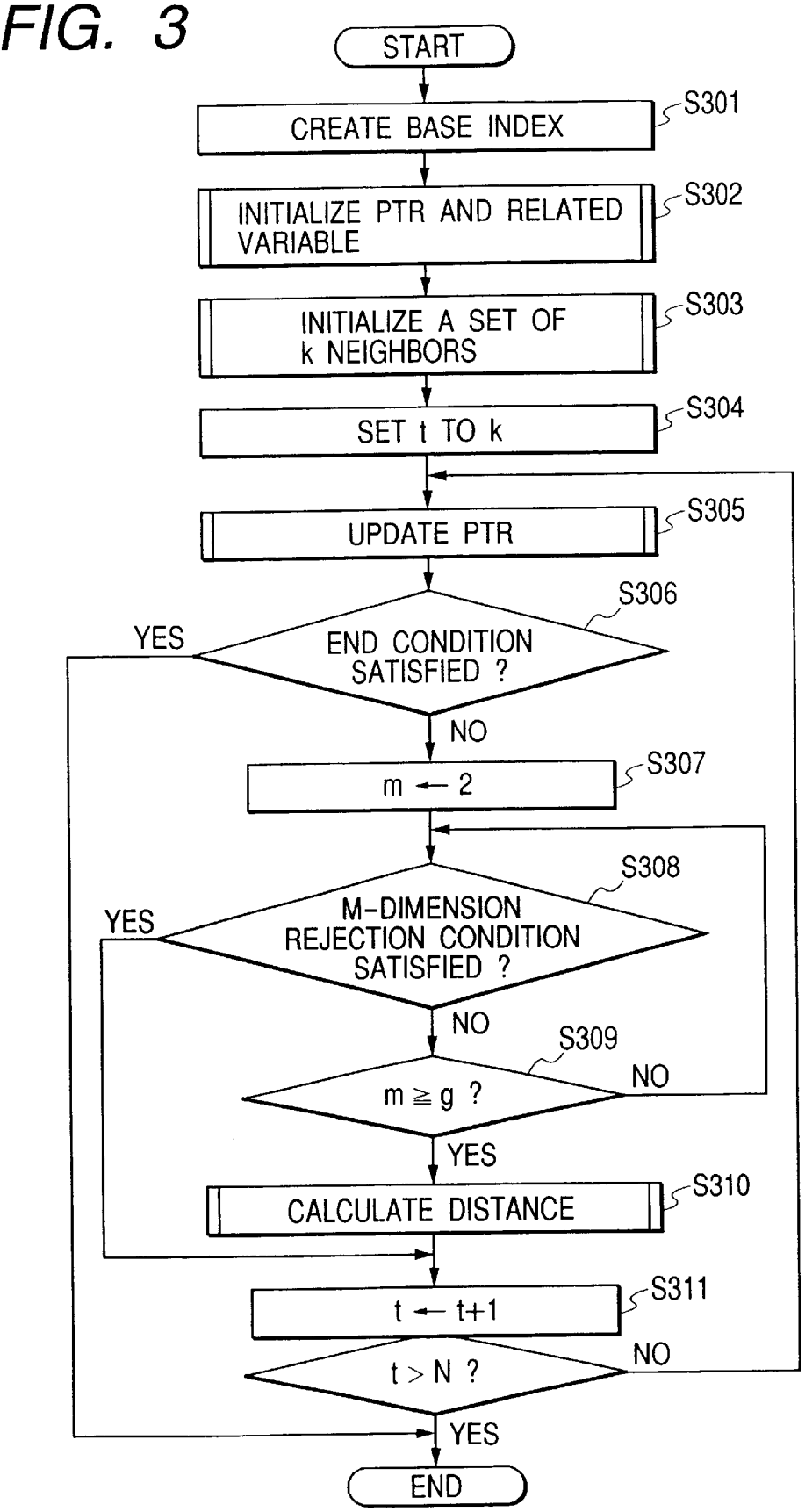
FIG. 3 is a flow chart illustrating a search process sequence.

At Step S611 the following process is executed to thereafter return to Step S306 of the search process shown in FIG. 3:

$$Dx = Dx_L, PTR = PTR_L, CAL_L = 0$$

At Step S612 the following process is executed to thereafter return to Step S306 of the search process shown in FIG. 3:

$$Dx = Dx_H, PTR = PTR_H, CAL_H = 0$$

In the update process for PTR, PTR and related variables are changed and if the end condition is satisfied, the search process shown in FIG. 3 is terminated. At Step S306 it is checked whether the end condition of the following formula is satisfied. If satisfied, the search process is terminated, whereas if not, the flow advances to Step S307.

$$Dx \geq \xi_{t-1} \tag{8}$$

At Steps S307 to S309 it is checked whether the rejection condition is satisfied. At Step S307 "2" is set to m.

At Step S308, the following process is executed:

$$n = I_m(PTR)$$

$$j = \lambda_m$$

$$Dx \leftarrow Dx + (Y_n(j) - X(j))^2$$

The obtained Dx is a square of the distance of Yn in the m-dimensional partial space.

It is checked whether the following formula is satisfied. If satisfied, the flow advances to Step S311, whereas if not, the flow advances to Step S308.

$$Dx \geq \xi_{t-1} \tag{9}$$

At Step S309 m is incremented by "1". If the incremented m is larger than g, the flow advances to Sep S310, whereas if not, the flow advances to Step S308.

Figure 7:
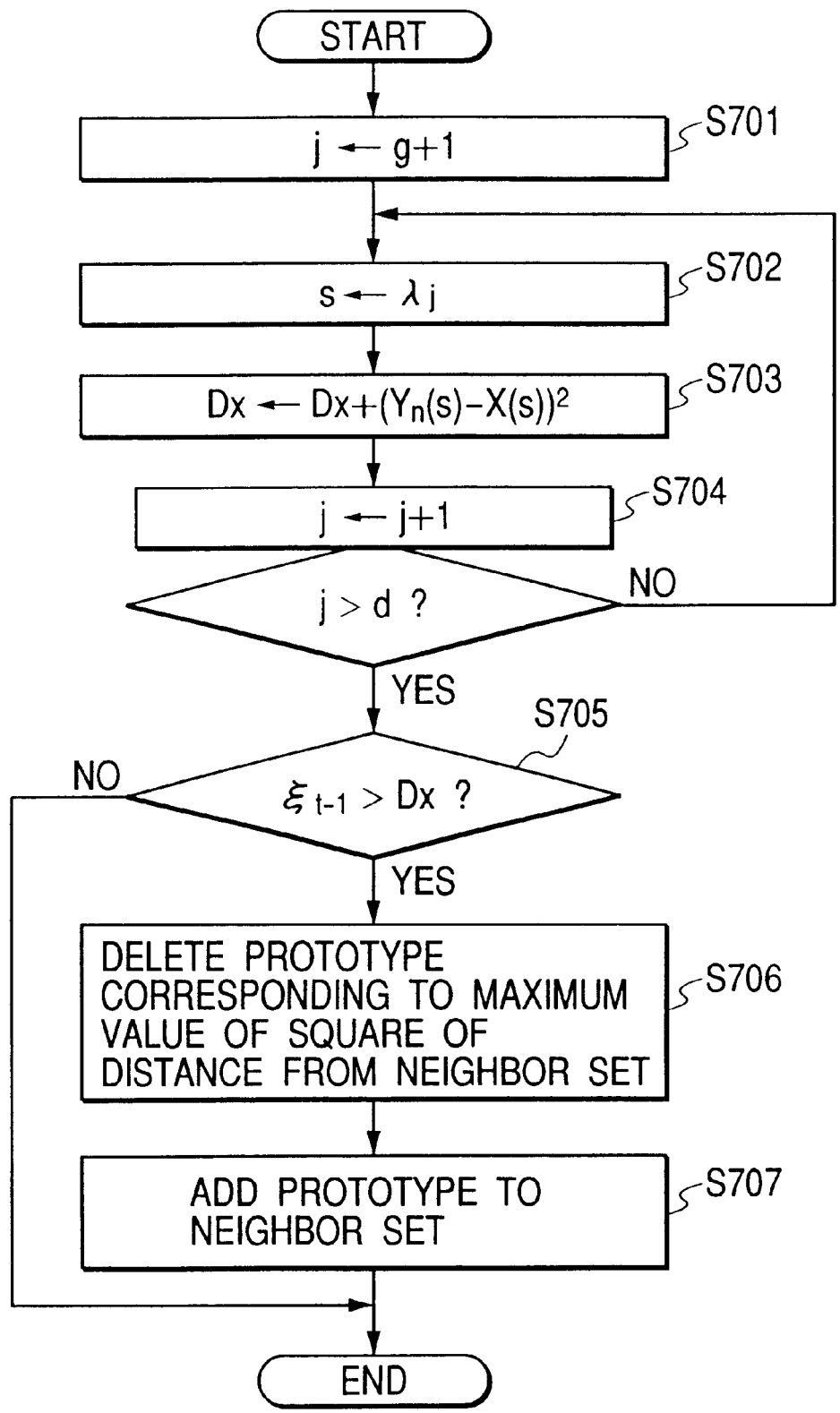
FIG. 7 is a flow chart illustrating a process sequence of distance calculation.

At Step S310 a distance calculation process to be described later with reference to the flow chart of FIG. 7 is executed to thereafter advance to Step S311.

At Step S311 t is incremented by "1". If the incremented t is larger than N, the search process is terminated, whereas if not, the flow returns to Step S305.

The distance calculation process at Step S310 will be described with reference to the flow chart of FIG. 7.

At Step S701 (g+1) is set to j. At Step S702 $\lambda_j$ is set to s. At Step S703 the following process is executed:

$$Dx \leftarrow Dx + (Y_n(s) - X(s))^2$$

where $n = I_m(PTR)$.

At Step S704 j is incremented by "1". If the incremented j is larger than the order d of the vector dimension, the flow advances to Step S705, whereas if not, the flow returns to Step S702. At Step S705 it is checked whether Dx is smaller than $\xi_{t-1}$. If smaller, the flow advances to Step S706, whereas if not, the distance calculation process is terminated.

At Steps S706 and S707 the neighbor set is updated. At Step S706 a pair of the ID number and a squared distance corresponding to $\xi_{t-1}$ is deleted from the neighbor set:

$$N_t(X) \leftarrow N_{t-1}(X) - \{(I_{MAX, t-1}, \xi_{t-1})\}$$

At Step S707 the following process is executed to thereafter return to Step S310 shown in FIG. 3:

$$N_t(X) \leftarrow N_{t-1}(X) + \{(I_m(PTR), Dx)\}$$

$N_t(X)$ after the termination at Step S305, Step S306 or S310 is output as the search result.

The effect of the embodiment described above was verified by experiments through computer calculations.

[Computer Experiments]

In order to verify the validity of the embodiment, computer experiments were made for the number k=10 of prototypes requested as the search results and for the number N=1000, 10000 of prototypes in each set. The following item was used as the experiment parameters:

the order of a vector dimension: d={10, 20, 30, 40, 50, 60, 70, 80, 90, 100}

The following values were checked by the experiments:

a change in the calculation amount with raising the order of a vector dimension; and a change in the calculation amount with the number N of prototypes.

The computer used by the experiments is as follows:

Silicon Graphics Co. 02

CPU: MIPS R10000, Rev 2.6 (174 MHz)

Main memory: 128 MB

OS: IRIX Release 6.3

The C programming language was used.

[Experiment Steps]

(1) A set of N prototypes of d-dimensional vector was generated by using uniform random numbers.

(2) One test vector of d-dimensional vector was generated by using uniform random numbers.

(3) An exhaustive search was conducted.

(4) A search was conducted by using the embodiment algorithm.

These four steps were repeated 100 times and an average of relative CPU times was calculated. The relative CPU time is (CPU time using the embodiment algorithm) divided by (CPU time using the exhaustive search).

Since the performance improvement for a raised order of a vector dimension was confirmed by a relatively small set of a relatively lower vector dimension, the performance of the k-NN search was testified for a larger set of prototypes of a higher vector dimension.

Figure 9:
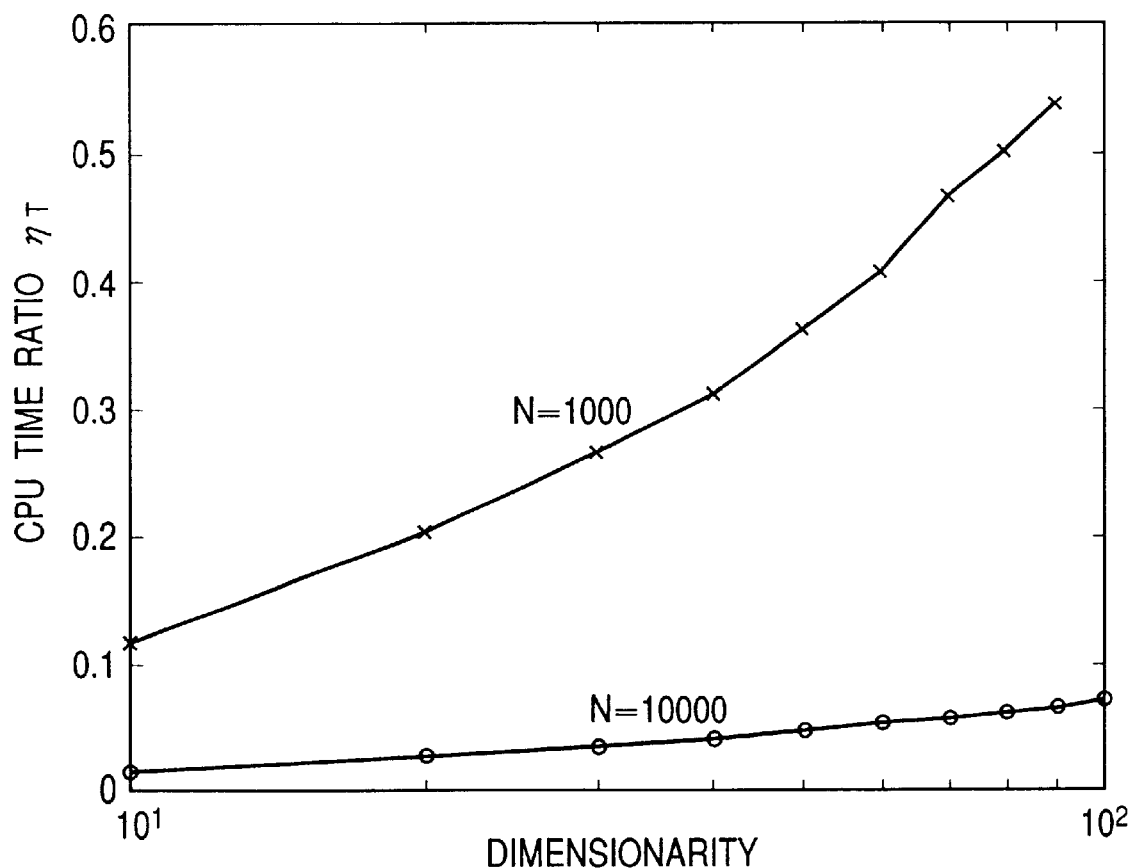
FIG. 9 is a graph showing the results of computer calculation experiments according to the first embodiment.
Figure 10:
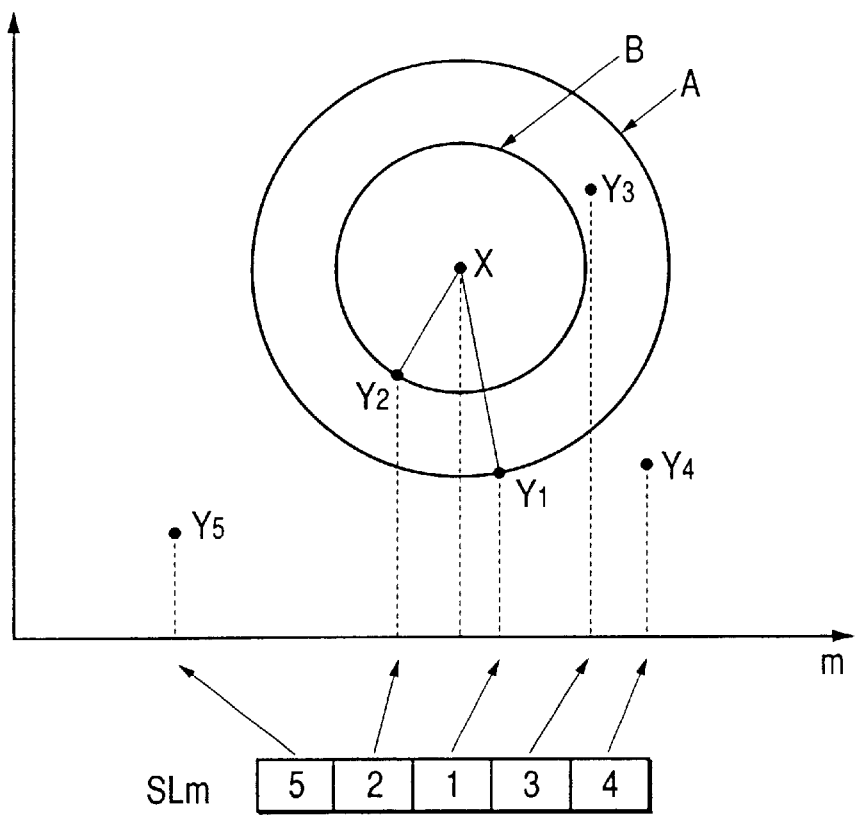
FIG. 10 is a diagram illustrating a principle of a mapping algorithm.

The experiment results are shown in the graph of FIG. 9. In this graph, the abscissa represents a vector dimensionality and the ordinate represents a relative CPU time (CPU time ratio) $\eta_T$. The prototype number N was used as a parameter.

It is seen from FIG. 9 that as the order of a vector dimension is raised, the relative CPU time ratio increases in linear order independently from the prototype number N. A slope at N=10000 is very small. The relative CPU time ratio at N=10000 is very small as 1% for ten-dimensional vector and 7% even for 90-dimensional vector. The search process of searching ten nearest prototypes from 10000 prototypes of 90-dimensional vector took 3.7 sec for an exhaustive search as compared to 0.26 sec for the embodiment algorithm.

[Second Embodiment]

In this embodiment, an equation representing a relation between an inner product and a distance is derived and the mapping algorithm is used as an inner product high speed calculation method. This algorithm of the embodiment is a generalized algorithm which does not require "hard" structurization of a prototype set and parameters to be set in advance.

Prior to describing the details of the embodiment algorithm, a subject of study and the definitions of words and symbols will be clarified.

The subject of study is to extract k prototypes from $\Omega$ which prototypes have a metric $\rho_G(X, Y_j)$ nearest to an arbitrarily given test vector $X \in R^d$, where $\Omega$ is a set of N prototypes $Y_j$ expressed as a d-dimensional vector:

$$\Omega = \{Y_1, Y_2, \ldots Y_N\}, Y_j \in R^d$$

The metric $\rho_G(X, Y_j)$ is defined as an inner product so that a space is assumed to be formed by spanning vector data by an orthogonal base:

$$\rho_G(X, Y) = X^T G Y = \sum_{n=1}^{n=d} \sum_{m=1}^{m=d} G(m, n) X(m) Y_j(n) \quad (1)$$

where k component values of the test vector X and prototype vector $Y_j$ are represented by X(k) and $Y_j(k)$, respectively.

A first feature of this embodiment is a function $\delta(Z, Y_j)$ is incorporated as a function of giving the same phase as the metric $\rho_G(X, Y_j)$. $\rho_G(X, Y_j)$ can be divided by the following two-step processes:

$$Z = GX$$

$$\rho_G(X, Y_j) = X^T G Y = (GX)^T Y = Z^T Y = \rho(Z, Y_j)$$

where $\rho(Z, Y_j)$ is an inner product in a normalized orthogonal system.

The following equation is obtained by developing a square of the distance between Z and $Y_j$:

$$\|Z - Y_j\|^2 = (Z - Y_j)^T (Z - Y_j) = \|Z\|^2 + \|Y_j\|^2 - 2\rho(Z, Y_j)$$

This equation is arranged to obtain the following equation:

$$2\rho(Z, Y_j) - \|Z\|^2 = \|Y_j\|^2 - \|Z - Y_j\|^2$$

The right (or left) side of this equation is defined as a new function $\delta(Z, Y_j)$:

$$\delta(Z, Y_j) = \|Y_j\|^2 - \|Z - Y_j\|^2$$

Figure 11:
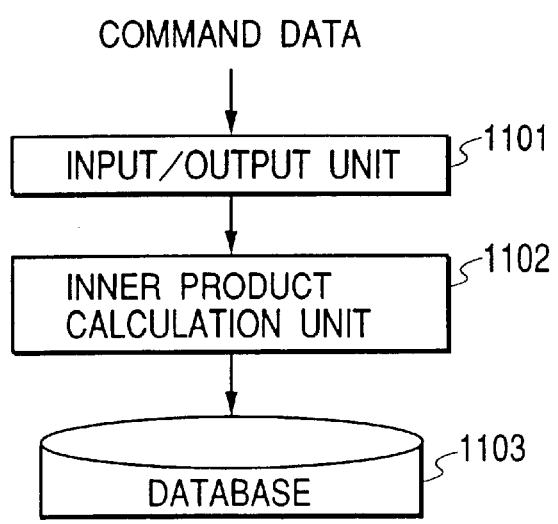
FIG. 11 is a functional diagram of a data processing apparatus according to a second embodiment.

FIG. 11 is a functional diagram of a data processing apparatus of the second embodiment. An input/output unit 1101 has an input unit such as a reception apparatus and a keyboard and an output unit such as a transmission apparatus and a display.

For example, in the case of a stand-alone computer, the input/output unit 1101 is constituted of a keyboard and a display. Data input from the keyboard is transferred to an inner product calculation unit 1102, and data supplied from the inner product calculation unit 1102 is displayed on the display.

Alternatively, in the case of a communications terminal equipment connected to a communications line, the input/output unit 1101 is constituted of a communications control apparatus for data transmission/reception. Data input via the communications line is transferred to the inner product calculation unit 1102, and data supplied from the inner product calculation unit 1102 is transmitted via the communications line to another terminal at a designated address.

The inner product calculation unit 1102 is realized by a CPU which executes each function program (corresponding to a process sequence shown in each of flow charts to be described later) stored in a ROM, a disk memory or the like, and has other memories such as a RAM for storing calculation results and various data generated during each process sequence.

A database 1103 stores a set of N prototypes expressed by d-dimensional vector, and is accessed by the inner product calculation unit 1102.

Figure 2:
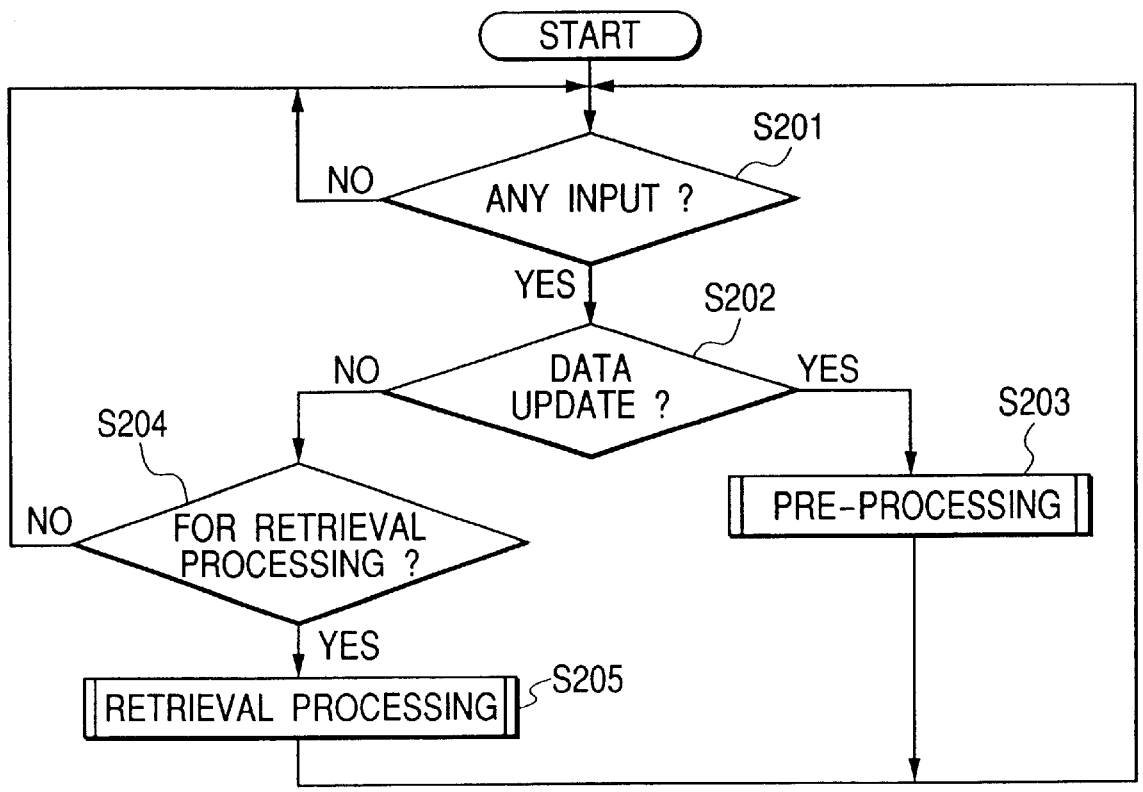
FIG. 2 is a flow chart illustrating a process sequence to be executed by a distance calculation unit.

The process to be executed by the inner product calculation unit 1102 is approximately similar to that shown in FIG. 2 to be executed by the distance calculation unit 102 of the first embodiment. In this embodiment, in place of the input/output unit 101 and database 103, the input/output unit 1101 and database 1103 are used.

The pre-process to be executed at Step S203 will be described. In this pre-process, sorting lists are formed with respect to a squared norm and reach component value of a prototype in a prototype set. The former squared norm $\|Y_j\|^2$ is calculated and stored. The latter component value is generated in a manner similar to the first embodiment described with reference to FIG. 8.

Next, the search process to be executed at Step S205 will be described with reference to the flow chart of FIG. 12.

Given as the input for the search process are a vector X (hereinafter called a test vector) to be searched, a metric tensor G and the number k of prototypes requested as the search results.

At Step S1201 the test vector X is multiplied by the metric tensor G at the left side to obtain a vector X:

$$Z=GX$$

At Step S1202 an index list is formed which stores bases of a vector space. This list decides the order of bases which are applied to an end condition and a rejection condition to be described later. For example, this list is formed in correspondence with a descending order of an absolute value of a component value of the test vector X:

$$\Lambda=\{\lambda_1, \lambda_2, \ldots, \lambda_d\} \quad (4)$$

A set of L bases from the smallest is written as:

$$\Lambda_L=\{\lambda_{d-L+1}, \lambda_{d-L+2}, \ldots, \lambda_d\} \quad (5)$$

At Step S1203 an initialization process for PTR and related variables is executed. This process is executed in a similar manner to the first embodiment shown in FIG. 4.

Figure 13:
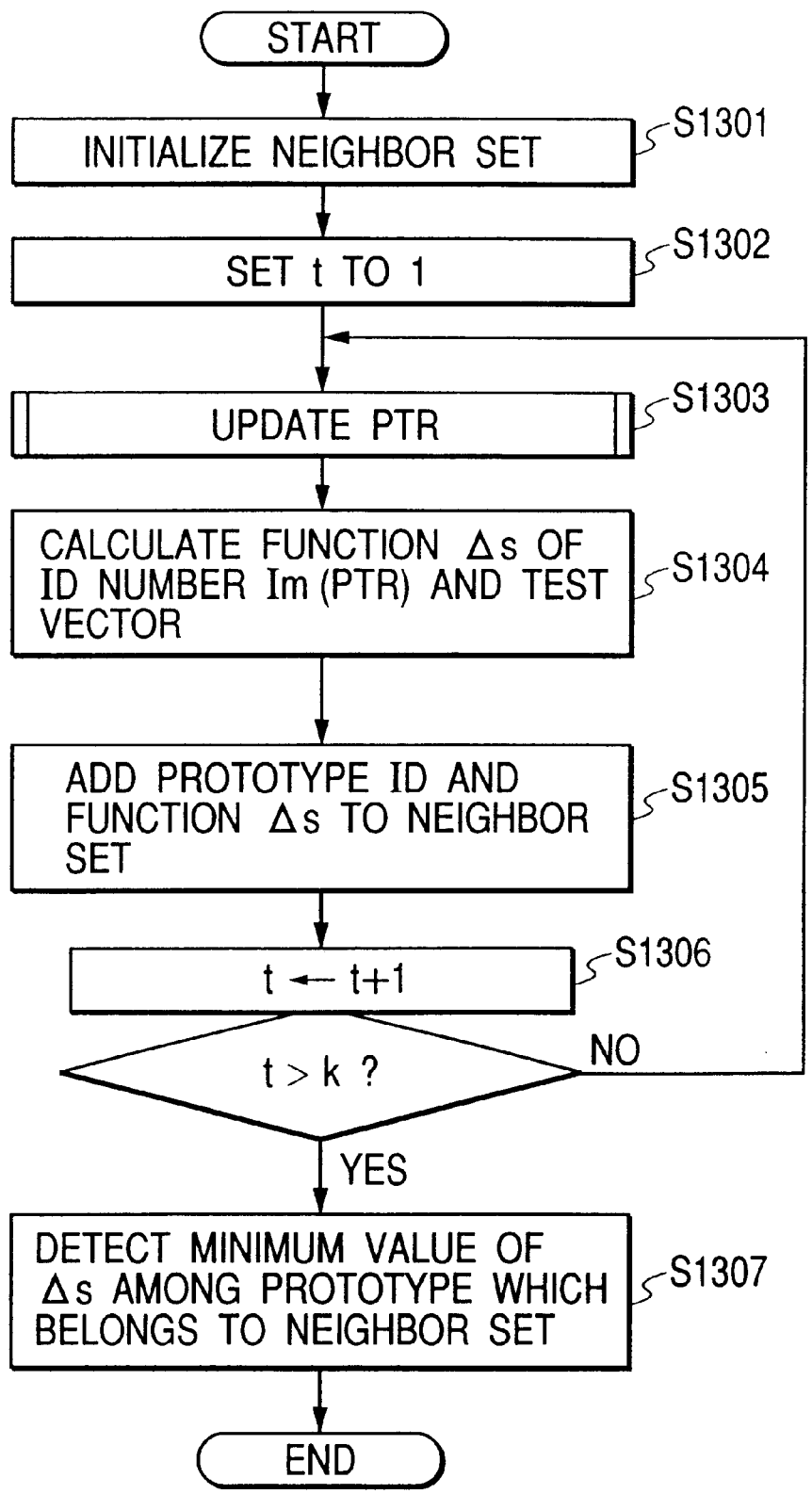
FIG. 13 is a flow chart illustrating an initialization process sequence for a neighbor set.

At Step S1204 a set of k neighbors is initialized. This process will be described with reference to the flow chart shown in FIG. 13.

At Step S1301, the neighbor set $N_0(X)$ is initialized to an empty set. At Step S1302 "1" is set to t. At Step S1303 PTR is updated, this process being executed in a similar manner to the first embodiment shown in FIG. 6. At Step S1304 a function $\Delta_s$ and the prototype $Y_{Im(PTR)}$ having the ID number $I_m(PTR)$ are calculated:

$$s=I_m(PTR)$$

$$\Delta_s=\|Y_s\|^2-\|Z-Y_s\|^2$$

Since the first term of the right side of this equation was calculated by the pre-process, only a read operation from a memory is performed.

At Step S1305 the prototype ID and the value $\Delta_s$ are added to the neighbor set $N_{t-1}(X)$:

$$N_t(X)=N_{t-1}(X)+\{(s, \Delta_s)\}$$

At Step S1306 t is incremented by "1". If t is larger than k, the flow advances to Step S1307, whereas if not, the flow returns to Step S1303.

At Step S1307 the minimum value $\Delta_s$ and corresponding ID number in the neighbor set are stored as $\xi_{t-1}$ and $\tau_{t-1}$, respectively.

Figure 12:
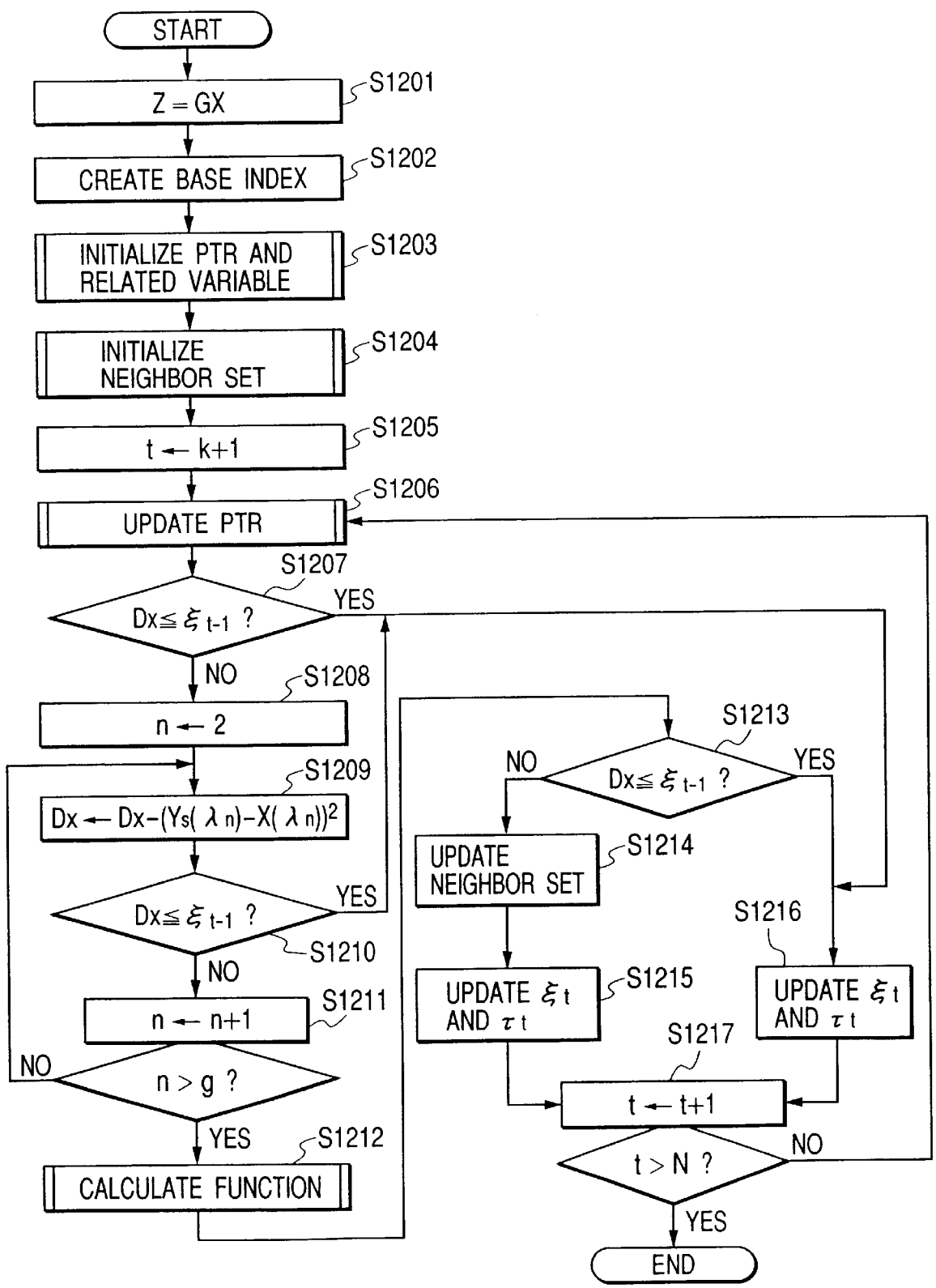
FIG. 12 is a flow chart illustrating a search process sequence.

Reverting to FIG. 12, at Step S1205 k is set to t. At Step S1206 an update process for PTR is executed. This process is performed in a similar manner to the first embodiment shown in FIG. 6. Equations to be used for calculations are, however, partially different from the first embodiment.

At Step S601 it is checked whether $PTR_L$ is smaller than 1. If smaller, the flow advances to Step S602, whereas if not, the flow advances to Step S603. At Step S602 the following process is executed:

$$BND_L=1, DX_L=\infty$$

At Step S603 it is checked whether $PTR_H$ is larger than N. If larger, the flow advances to Step S604, whereas if not, the flow advances to Step S605. At Step S604 the following process is executed:

$$BND_H=1, DX_H=\infty$$

At Step S605 it is checked whether a product of $BND_L$ and $CAL_L$ is "1". If "1", the search process is terminated, whereas if not, the flow advances to Step S606.

At Step S606 it is checked whether $BND_L+CAL_L$ is "1". If "1", the flow advances to Step S607, whereas if not, the flow advances to step S607. At Step S607 the following process is executed:

$$DX_L=\|Y_{Im}(PTR_L)\|^2-(V_m(PTR_L)-Z(m))^2$$

$$CAL_L=1$$

At Step S608 it is checked whether $BND_H+CAL_H$ is "1". If "1", the flow advances to Step S609, whereas if not, the flow advances to Step S610. At Step S609 the following process is executed:

$$DX_H=\|Y_{Im}(PTR_H)\|^2-(V_m(PTR_H)-Z(m))^2$$

$$CAL_H=1$$

If $DX_L$ is smaller than $Dx_H$ at Step S610, the flow advances to Step S611, whereas if not, the flow advances to Step S612.

At Step S611 the following process is executed to thereafter return to Step S1206 shown in FIG. 12:

$$Dx=Dx_L, PTR=PTR_L, CAL_L=0$$

At Step S612 the following process is executed to thereafter return to Step S1206 shown in FIG. 12:

$$Dx=Dx_H, PTR=PTR_H, CAL_H=0$$

In the update process for PTR, PTR and related variables are changed and if the end condition is satisfied, the search process shown in FIG. 12 is terminated. At Step S1207 it is checked whether the value Dx calculated at Step S1206 satisfies the following formula, and if satisfied, the flow advances to Step S1216, whereas if not, the flow advances to Step S1208:

$$Dx \leq \xi_{t-1}$$

At Step S1208 "2" is set to n. At Step S1209, the following process is executed:

$$s=I_m(PTR)$$

$$Dx \leftarrow Dx-(Y_s(\lambda_n)-X(\lambda_n))^2$$

At Step S1210 it is checked whether the value Dx satisfies the following formula, and if satisfied, the flow advances to Step S1216, whereas if not, the flow advances to Step S1211:

$$Dx \leq \xi_{t-1}$$

At Step S1211 n is incremented by "1". If the incremented n is larger than g, the flow advances to Sep S1212, whereas if not, the flow advances to Step S1209.

Figure 14:
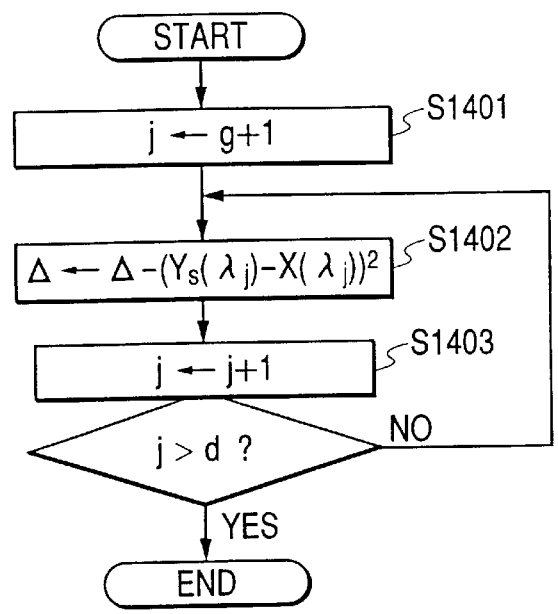
FIG. 14 is a flow chart illustrating a function calculation process sequence.

At Step S1212 a function calculation to be later described with reference to FIG. 14 is executed to thereafter advance to Step S1213. If g is equal to the vector dimension order d, the function calculation is not performed and the flow advances to Step S1214.

At Step S1213 it is checked whether the value Dx updated by the function calculation at Step S1212 satisfies the following formula, and if satisfied, the flow advances to Step S1216, whereas if not, the flow advances to Step S1214;

$$Dx \leq \xi t-1$$

At Step S1214 an element corresponding to $\xi_{t-1}$ is deleted from the neighbor set and a prototype currently processed is added;

$$N_t(X) \leftarrow N_{t-1}(X) - \{(\tau_{t-1}, \xi_{t-1})\} + \{(I_m(PTR), Dx)\}$$

At Sep S1215, the minimum Dx and corresponding ID number of $N_t(X)$ elements are stored as $\xi_t$ and $\tau_t$, respectively to advance to Step S1217.

At Step S1216 the following processes are executed to thereafter advance to Step S1217:

$$\xi_t = \xi_{t-1}, \tau_t = \tau_{t-1}$$

At Step S1217 t is incremented by "1". If the incremented t is larger than N, the process is terminated, whereas if not, the flow returns to Step S1206.

The function calculation to be executed at Step S1212 will be described with reference to FIG. 7.

At Step S1401, (g+1) is set to j. At Step S1402 the following process is executed.

$$Dx \leftarrow Dx-(Y_s(\lambda_j)-X(\lambda_j))^2$$

At Step S1403, j is incremented by "1". If the incremented j is larger than the vector dimension order d, the function calculation at Step S1212 is terminated, whereas if not, the flow returns to Step S1402.

$N_j(X)$ after the completion of Step S1217 is output as the search result.

The effect of the embodiment described above was verified by experiments through computer calculations.

[Computer Experiments]

In order to verify the validity of the second embodiment, computer experiments were made for the number k=10 of prototypes requested as the search results and for the number N=10000 of prototypes. The following item was used as the experiment parameters:

the order of a vector dimension: d={10, 20, 30, 40, 50, 60, 70, 80, 90, 100}

The computer used by the experiments is as follows:

Silicon Graphics Co. O2

CPU: MIPS R10000, Rev 2.6 (175 MHz)

Main memory: 128 MB

OS: IRIX Release 6.3

The C programming language was used.

[Experiment Steps]

(1) A set of N prototypes of d-dimensional vector was generated by using uniform random numbers.

(2) One metric tensor of d-dimensional vector was generated by using uniform random numbers.

(3) One test vector of d-dimensional vector was generated by using uniform random numbers.

(4) An exhaustive search was conducted.

(5) A search was conducted by using the embodiment algorithm.

These five steps were repeated 100 times and an average of relative CPU times was calculated. The relative CPU time is (CPU time using the embodiment algorithm) divided by (CPU time using the exhaustive search).

Figure 15:
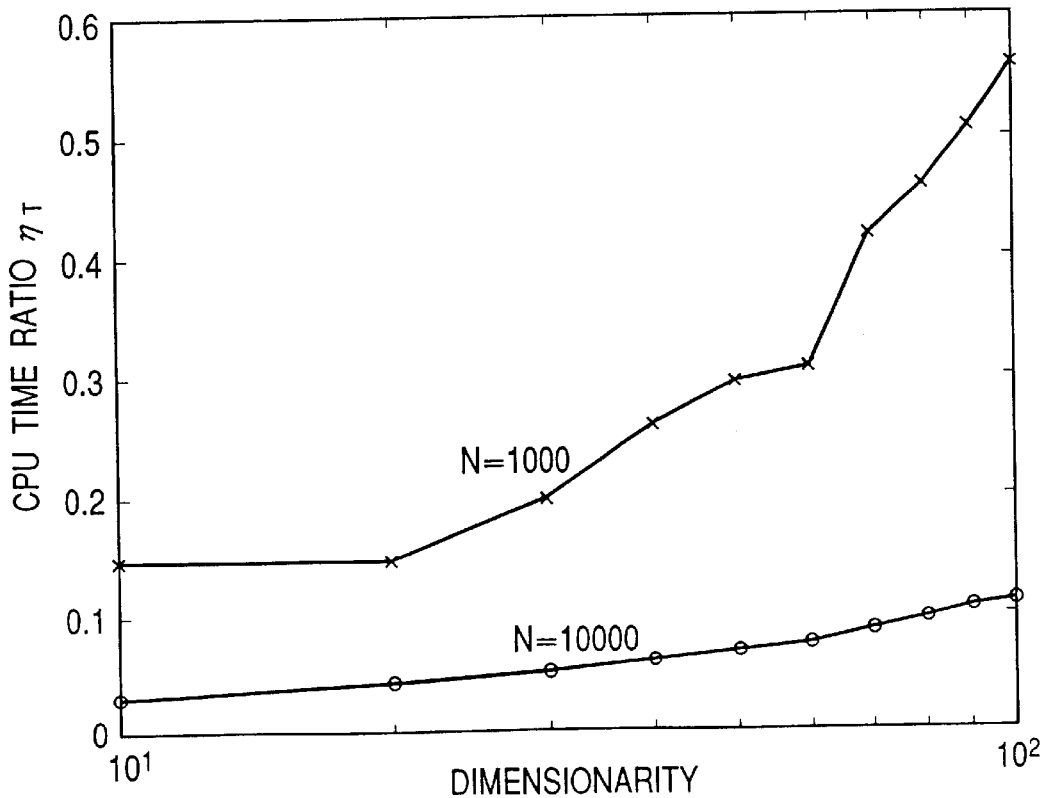
FIG. 15 is a graph showing the results of computer calculation experiments according to the second embodiment.

The experiment results are shown in the graph of FIG. 15. In this graph, the abscissa represents a vector dimensionality and the ordinate represents a relative CPU time (CPU time ratio) $\eta_T$. The prototype number N was used as a parameter.

It is seen from FIG. 15 that as the order of a vector dimension is raised, the relative CPU time ratio increases in linear order independently from the prototype number N. A slope at N=10000 is very small. The relative CPU time ratio at N=10000 is very small as 3% for ten-dimensional vector and 11% even for 100-dimensional vector. The search process of searching ten nearest prototypes from 10000 prototypes of 100-dimensional vector took 3.7 sec for an exhaustive search as compared to 0.40 sec for the embodiment algorithm.

As described above, according to the embodiment a predetermined number of data pieces can be retrieved from a vector data set at high speed in accordance with an inner product of a given vector data. For example, a database such as an image database can be searched at high speed.

The invention is applicable to a system constituted of a plurality of computers as wall as a particular computer in the system. The invention may be realized by a program to be executed by a computer. This program may be supplied from an external storage medium. Such a storage medium storing the program falls in the scope of this invention.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A data processing apparatus comprising:

a database storing a set of data of a vector format;

list forming means for forming a list of data of said database arranged in an order of a value of each component of a vector, for each component;

input means for inputting test data of a vector format;

component selecting means for sequentially selecting each component of the vector format;

data selecting means for sequentially selecting data in an ascending order of a difference of values between the data and the test data from the list, for a first component of the vector format selected by said component selection means;

component distance calculating means for sequentially calculating a square of a component distance for each component selected by said component selection means between the data selected by said data selecting means and the test data;

partial distance calculating means for sequentially calculating squares of partial distances in different partial spaces between the selected data and the test data by adding a preceding square of a partial distance with a square of distance for a component newly calculated by said component distance calculation means;

whole distance calculating means for calculating a square of distance in a whole space between the selected data and the test data by summing up squares of distances for all components;

retrieving means for retrieving a predetermined number of data pieces in an ascending order of a distance calculated by said whole distance calculating means;

terminating means for terminating data selection by said data selecting means, if a square of a difference of values for the first component between one data piece currently selected by said data selecting means and the test data is not less than a first predetermined value; and distance calculating control means for controlling said whole distance calculating means to omit the calculation of the square of the whole distance in the whole space between the selected data and the test data, when a square of a partial distance in a partial space newly calculated by said partial distance calculating means between the selected data and the test data is not less than a second predetermined value.

2. A data processing apparatus according to claim 1, wherein said list forming means forms a list storing values of components of each data piece in an order of values and a list storing an identifier of each data piece in the order of values, for each component.

3. A data processing apparatus according to claim 1, wherein said component selecting means selects one component in a descending order of an absolute value of each component value of the test data.

4. A data processing apparatus according to claim 1, wherein said retrieving means comprises:

data storage means for storing the predetermined number of data pieces and a maximum value of a square of the whole distance in the whole space between each of the predetermined number of data pieces and the test data; and storage control means for, if a square of a whole distance of data newly calculated by said whole distance calculating means is smaller than the maximum value, updating the maximum value by the newly calculated square of the whole distance and adding the data to said data storage means in place of data corresponding to the preceding maximum value.

5. A data processing apparatus according to claim 4, wherein the first predetermined value is the maximum value.

6. A data processing apparatus according to claim 4, wherein the second predetermined value is the maximum value.

7. A data processing apparatus comprising:

a database storing a set of data of a vector format;

pre-processing means for calculating a square of a norm of each data piece in said database and forming a list of data arranged in an order of a value of each component of the vector, for each component;

input means for inputting test data of the vector format and operating a metric tensor upon the test data;

component selecting means for sequentially selecting each component of the vector format;

data selecting means for sequentially selecting data in an ascending order of a difference of values between the data and the test data from the list, for a first component of the vector format selected by said component selection means;

component distance calculating means for sequentially calculating a square of a component distance for each component selected by said component selection means between the data selected by said data selecting means and the test data;

partial similarity calculating means for sequentially calculating partial similarities in different partial spaces between the selected data and the test data by subtracting a square of distance for a component newly calculated by said component distance calculation means from a preceding partial similarity;

whole similarity calculating means for calculating a whole similarity in a whole space between the selected data and the test data by subtracting squares of distances for all components from a square of a norm of the data;

retrieving means for retrieving a predetermined number of data pieces in a descending order of the similarity calculated by said whole similarity calculating means; and similarity calculating means for controlling said whole similarity calculating means to omit the calculation of the whole similarity in the whole space between the selected data and the test data, when a partial similarity in a partial space newly calculated by said partial similarity calculating means between the selected data and the test data is not more than a predetermined value.

8. A data processing apparatus according to claim 7, wherein said list forming means forms a list storing values of components of each data piece in an order of values and a list storing an identifier of each data piece in the order of values, for each component.

9. A data processing apparatus according to claim 7, wherein said component selecting means selects one component in a descending order of an absolute value of each component value of the test data.

10. A data processing apparatus according to claim 7, wherein said retrieving means comprises:

data storage means for storing the predetermined number of data pieces and a minimum value of the whole similarity in the whole space between each of the predetermined number of data pieces and the test data; and storage control means for, if the whole similarity of data newly calculated by said whole similarity calculating means is larger than the minimum value, updating the minimum value by the newly calculated whole similarity and adding the data to said data storage means in place of data corresponding to the preceding minimum value.

11. A data processing apparatus according to claim 10, wherein the predetermined value is the minimum value.

12. A data processing apparatus according to claim 7, wherein the similarity between the data and the test data is represented by a value of the square of the norm of the data subtracted by a square of a distance between the test data operated upon the metric tensor and the data.

13. A data processing method comprising:

a list forming step of forming a list of data in a database storing a set of data of a vector format, for each component of a vector, the data in the list being arranged in an order of a value of each component;

an input step of inputting test data of a vector format;

a component selecting step of sequentially selecting each component of the vector format;

data selecting step of sequentially selecting data in an ascending order of a difference of values between the data and the test data from the list, for a first component of the vector format selected at said component selection step;

component distance calculating step of sequentially calculating a square of a component distance for each component selected at said component selection step between the data selected at said data selecting step and the test data;

partial distance calculating step of sequentially calculating squares of partial distances in different partial spaces between the selected data and the test data by adding a preceding square of a partial distance with a square of distance for a component newly calculated at said component distance calculation step;

whole distance calculating step of calculating a square of distance in a whole space between the selected data and the test data by summing up squares of distances for all components;

retrieving step of retrieving a predetermined number of data pieces in an ascending order of a distance calculated at said whole distance calculating step;

terminating step of terminating data selection at said data selecting step, if a square of a difference of values for the first component between one data piece currently selected at said data selecting step and the test data is not less than a first predetermined value; and distance calculating control step of controlling said whole distance calculating step to omit the calculation of the square of the whole distance in the whole space between the selected data and the test data, when a square of a partial distance in a partial space newly calculated at said partial distance calculating step between the selected data and the test data is not less than a second predetermined value.

14. A data processing method according to claim 13, wherein said list forming step forms a list storing values of components of each data piece in an order of values and a list storing an identifier of each data piece in the order of values, for each component.

15. A data processing method according to claim 13, wherein said component selecting step selects one component in a descending order of an absolute value of each component value of the test data.

16. A data processing method according to claim 13, wherein said retrieving step comprises:

a data storage step of storing the predetermined number of data pieces and a maximum value of a square of the whole distance in the whole space between each of the predetermined number of data pieces and the test data, in a data storage unit; and a storage control step of, if a squared of a whole distance of data newly calculated by said whole distance calculating step is smaller than the maximum value, updating the maximum value by newly calculated square of the whole distance and adding the data to the data storage unit in place of data corresponding to the preceding maximum value.

17. A data processing method according to claim 16, wherein said completion judging step judges to terminate the data selection, if the square of a difference of a component value is equal to or larger than the maximum value.

18. A data processing method according to claim 16, wherein the first predetermined value is the maximum value.

19. A data processing method comprising:

a database storing a set of data of a vector format;

a pre-processing step of calculating a square of a norm of each data piece in a database storing a set of data of a vector format and forming alist of data arranged in an order of a value of each component of the vector, for each component;

an input step of inputting test data of the vector format and operating a metric tensor upon the test data;

a component selecting step of sequentially selecting each component of the vector format;

data selecting step of sequentially selecting data in an ascending order of a difference of values between the data and the test data from the list, for a first component of the vector format selected at said component selection step;

component distance calculating step for sequentially calculating a square of a component distance for each component selected at said component selection step between the data selected at said data selecting step and the test data;

partial similarity calculating step of sequentially calculating partial similarities in different partial spaces between the selected data and the test data by subtracting a square of distance for a component newly calculated at said component distance calculation step from a preceding partial similarity;

whole similarity calculating step of calculating a whole similarity in a whole space between the selected data and the test data by subtracting squares of distances for all components from a square of a norm of the data;

retrieving step of retrieving a predetermined number of data pieces in a descending order of the similarity calculated at said whole similarity calculating step; and similarity calculating step of controlling said whole similarity calculating step to omit the calculation of the whole similarity in the whole space between the selected data and the test data, when a partial similarity in a partial space newly calculated at said partial similarity calculating step between the selected data and the test data is not more than a predetermined value.

20. A data processing method according to claim 19, wherein said list forming step forms a list storing values of components of each dat piece in an order of values and the list storing an identifier of each data piece in the order of values, for each component.

21. A data processing method according to claim 19, wherein said component selecting step selects one component in a descending order of an absolute value of each component value of the test data.

22. A data processing method according to claim 19, wherein said retrieving step comprises:
- a data storage step of storing the predetermined number of data pieces and a minimum value of the whole similarity in the whole space between each of the predetermined number of data pieces and the test data, in a data storage unit; and
- a storage control step of, if the whole similarity of data newly calculated by said whole similarity calculating step is larger than the minimum value, updating the minimum value by the newly calculated whole similarity and adding the data to the data storage unit in place of data corresponding to the preceding minimum value.

23. A data processing method according to claim 22, wherein the predetermined value is the minimum value.

24. A data processing method according to claim 19, wherein the similarity between the data and the test data is represented by a value of the square of the norm of the data subtracted by a square of a distance between the test data operated upon the metric tensor and the data.

25. A computer-readable storage medium storing a program for controlling a computer to perform data processing, said program comprising codes for causing the computer to perform:
- a list forming step of forming a list of data in a database storing a set of data of a vector format, for each component of a vector, the data in the list being arranged in an order of a value of each component;
- an input step of inputting test data of a vector format;
- a component selecting step of sequentially selecting each component of the vector format;
- data selecting step of sequentially selecting data in an ascending order of a difference of values between the data and the test data from the list, for a first component of the vector format selected at said component selection step;
- component distance calculating step of sequentially calculating a square of a component distance for each component selected at said component selection step between the data selected at said data selecting step and the test data;
- partial distance calculating step of sequentially calculating squares of partial distances in different partial spaces between the selected data and the test data by adding a preceding square of a partial distance with a square of distance for a component newly calculated at said component distance calculation step;
- whole distance calculating step of calculating a square of distance in a whole space between the selected data and the test data by summing up squares of distances for all components;
- retrieving step of retrieving a predetermined number of data pieces in an ascending order of a distance calculated at said whole distance calculating step;
- terminating step of terminating data selection at said data selecting step, if a square of a difference of values for the first component between one data piece currently selected at said data selecting step and the test data is not less than a first predetermined value; and
- distance calculating control step of controlling said whole distance calculating step to omit the calculation of the square of the whole distance in the whole space between the selected data and the test data, when a square of a partial distance in a partial space newly calculated at said partial distance calculating step between the selected data and the test data is not less than a second predetermined value.

26. A computer-readable storage medium storing a program for controlling a computer to perform data processing, said program processing comprising codes for causing the computer to perform:
- a pre-processing step of calculating a square of a norm of each data piece in a database storing a set of data of a vector format and forming alist of data arranged in an order of a value of each component of the vector, for each component;
- an input step of inputting test data of the vector format and operating a metric tensor upon the test data;
- a component selecting step of sequentially selecting each component of the vector format;
- data selecting step of sequentially selecting data in an ascending order of a difference of values between the data and the test data from the list, for a first component of the vector format selected at said component selection step;
- component distance calculating step for sequentially calculating a square of a component distance for each component selected at said component selection step between the data selected at said data selecting step and the test data;
- partial similarity calculating step of sequentially calculating partial similarities in different partial spaces between the selected data and the test data by subtracting a square of distance for a component newly calculated at said component distance calculation step from a preceding partial similarity;
- whole similarity calculating step of calculating a whole similarity in a whole space between the selected data and the test data by subtracting squares of distances for all components from a square of a norm of the data;
- retrieving step of retrieving a predetermined number of data pieces in a descending order of the similarity calculated at said whole similarity calculating step; and
- similarity calculating step of controlling said whole similarity calculating step to omit the calculation of the whole similarity in the whole space between the selected data and the test data, when a partial similarity in a partial space newly calculated at said partial similarity calculating step between the selected data and the test data is not more than a predetermined value.

* * * * *

UNITED STATES PATENT AND TRADEMARK OFFICE
CERTIFICATE OF CORRECTION

PATENT NO. : 6,578,031 B1
DATED : June 10, 2003
INVENTOR(S) : Teruyoshi Washizawa It is certified that error appears in the above-identified patent and that said Letters Patent is hereby corrected as shown below:

Drawings,
Sheet 8, Fig. 9, "DIMENSIONARITY" should read -- DIMENSIONALITY --; and
Sheet 12, Fig. 15, "DIMENSIONARITY" should read -- DIMENSIONALITY --.

Column 20,
Line 27, "alist" should read -- a list --.

Column 21,
Line 1, "dat" should read -- data --.

Column 22,
Line 21, "alist" should read -- a list --.

Signed and Sealed this

Eleventh Day of November, 2003

JAMES E. ROGAN
*Director of the United States Patent and Trademark Office*